(12) United States Patent
Anderson et al.

(10) Patent No.: US 10,266,703 B2
(45) Date of Patent: Apr. 23, 2019

(54) POLYOLEFIN POLYOLS AS SURFACE MODIFYING AGENTS

(71) Applicant: Dow Global Technologies LLC, Midland, MI (US)

(72) Inventors: Kyle Anderson, Freeport, TX (US); Ling Zhang-Watson, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/528,664

(22) PCT Filed: Nov. 13, 2015

(86) PCT No.: PCT/US2015/060643
§ 371 (c)(1),
(2) Date: May 22, 2017

(87) PCT Pub. No.: WO2016/089578
PCT Pub. Date: Jun. 9, 2016

(65) Prior Publication Data
US 2017/0275471 A1  Sep. 28, 2017

Related U.S. Application Data

(60) Provisional application No. 62/085,873, filed on Dec. 1, 2014.

(51) Int. Cl.
| | | |
|---|---|---|
| C08L 51/08 | (2006.01) | |
| C08L 23/08 | (2006.01) | |
| C09D 5/00 | (2006.01) | |
| C08J 7/04 | (2006.01) | |
| C08F 255/02 | (2006.01) | |
| C08K 5/053 | (2006.01) | |
| C09D 151/06 | (2006.01) | |

(52) U.S. Cl.
CPC ............ *C09D 5/002* (2013.01); *C08F 255/02* (2013.01); *C08J 7/042* (2013.01); *C08J 7/047* (2013.01); *C08K 5/053* (2013.01); *C08L 51/08* (2013.01); *C09D 151/06* (2013.01); *C08J 2323/02* (2013.01); *C08J 2323/06* (2013.01); *C08J 2451/06* (2013.01)

(58) Field of Classification Search
CPC .................................. C08L 23/08; C08L 51/08
See application file for complete search history.

(56) References Cited

U.S. PATENT DOCUMENTS

| | | | | |
|---|---|---|---|---|
| 4,575,532 | A * | 3/1986 | Schmukler | C08G 81/02 264/171.28 |
| 6,613,827 | B2 * | 9/2003 | Lundgard | C08G 18/0876 524/386 |
| 8,476,403 | B2 * | 7/2013 | Potter | C08F 255/00 528/392 |
| 2006/0155028 | A1 * | 7/2006 | Lee | C08L 23/0815 524/386 |
| 2012/0040195 | A1 * | 2/2012 | Williams | C08F 255/00 428/461 |
| 2015/0247014 | A1 * | 9/2015 | Oner-Deliormanli | C08L 23/0807 525/74 |

FOREIGN PATENT DOCUMENTS

WO  WO-2014200452 A2 *  12/2014  ......... C08G 18/4841

OTHER PUBLICATIONS

Eastoflex E1200 product data sheet. Eastman Chemical Company, Feb. 2, 2016. (Year: 2016).*

* cited by examiner

*Primary Examiner* — Rip A Lee
(74) *Attorney, Agent, or Firm* — Husch Blackwell LLP

(57) ABSTRACT

A functionalized ethylene-based polymer dissolved in an appropriate solvent and applied to a nonpolar surface can change the surface polarity/characteristics of the nonpolar surface. This change to the surface polarity/characteristics of the nonpolar surface allows adhesion of materials, such as paint, to surfaces such as polypropylene, polyethylene and polyolefin elastomers.

15 Claims, No Drawings

POLYOLEFIN POLYOLS AS SURFACE MODIFYING AGENTS

FIELD OF THE INVENTION

This invention relates to polyolefin polyols and their use as surface modifying agents for nonpolar substrates.

BACKGROUND OF THE INVENTION

Polyolefins are a family of polymeric materials that have found uses in a wide range of applications. However, due to their nonpolar nature, adhesion of paint and other polar coatings to polyolefin surfaces remains a major challenge.

SUMMARY OF THE INVENTION

In one embodiment the invention is the use of a functionalized ethylene-based polymer dissolved in an appropriate solvent to change the surface polarity/characteristics of a nonpolar surface. This change to the surface polarity/characteristics of the nonpolar surface allows adhesion of materials, such as paint, to surfaces such as polypropylene, polyethylene and polyolefin elastomers.

In one embodiment the invention is an article comprising a substrate formed from a composition comprising at least one olefin-based polymer, wherein the substrate is coated with a primer film formed from a primer composition, wherein the primer composition comprises the following (A) and (B):
  (A) From 5.0 to 20.0 weight percent, based on the weight of the primer composition, of a mixture comprising the following:
    (1) At least one polyol,
    (2) A functionalized ethylene-based polymer that comprises the following properties:
      (a) A density from 0.855 to 0.90 g/cc, and
      (b) A melt viscosity (at 177° C.) from 8,000 to 20,000 cP, and
      (c) A functional group capable of further reaction,
    (3) Optionally, at least one polar polymer; and
    (4) Reaction products of (1) and (2), and, optionally, (3); and
  (B) Greater than, or equal to 80.0 weight percent, based on the weight of the primer composition, of at least one solvent.

In one embodiment the invention is a mixture comprising:
  (A) At least one polyol,
  (B) A functionalized ethylene-based polymer that comprises the following properties:
    (1) A density from 0.860 to 0.890 g/cc, and
    (2) A melt viscosity (at 177° C.) from 8,000 to 20,000 cP, and
    (3) A functional group capable of further reaction
  (C) Optionally, at least one polar polymer; and
  (D) Reaction products of (1) and (2), and, optionally, (3).

DETAILED DESCRIPTION OF THE PREFERRED EMBODIMENT

Definitions

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, density, melt viscosity, reagent amounts and process conditions.

"Comprising," "including," "having" and like terms are not intended to exclude the presence of any additional component, step or procedure, whether or not the same is specifically disclosed. In order to avoid any doubt, all processes claimed through use of the term "comprising" may include one or more additional steps, pieces of equipment or component parts, and/or materials unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or," unless stated otherwise, refers to the listed members individually as well as in any combination.

"Composition" and like terms mean a mixture of two or more materials. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

"Polymer" means a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities, for example, catalyst residues, may be incorporated into and/or within the polymer.

"Interpolymer" means a polymer prepared by the polymerization of at least two different types of monomers. The generic term interpolymer includes copolymers (which refers to polymers prepared from two different monomers), and polymers prepared from more than two different types of monomers.

"Olefin-based polymer" and like terms mean a polymer containing, in polymerized form, a majority weight percent of an olefin, for example ethylene or propylene, based on the total weight of the polymer. Non-limiting examples of olefin-based polymers include ethylene-based polymers and propylene-based polymers.

"Propylene-based polymer" or "propylene polymer" means a polymer that comprises a majority amount of polymerized propylene based on the weight of the polymer and, optionally, may comprise at least one comonomer.

"Ethylene-based polymer" or "ethylene polymer" means a polymer that comprises a majority amount of polymerized ethylene based on the weight of the polymer and, optionally, may comprise at least one comonomer.

"Ethylene-based interpolymer" or "ethylene interpolymer" means an interpolymer that comprises a majority amount of polymerized ethylene based on the weight of the interpolymer, and comprises at least one comonomer.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

"Inertly-substituted hydrocarbyl" and like terms means a hydrocarbyl substituted with one or more substituent atoms or groups, e.g., a halogen, which do not undesirably interfere with the formulation and use of the primer composition.

"Ambient conditions" and like terms mean about 23° C. and atmospheric pressure.

Component (A) Mixture of the Primer Composition

Polyols

Polyols suitable for use in the present invention are polycarbonate polyols, polyester polyols, polyalkylene polyols, preferably, polyether polyols. The polyol used in the present invention preferably has a functionality (reactive hydrogens per molecule) of 1 to 30, preferably 1 to 8, more preferably 2 to 8, still more preferably 2 to 4, and hydroxyl numbers of 225 to 561, preferably of 75 to 14. Desirably, the polyol has a low level of unsaturation. Unsaturation is a measure of allyl- or propenyl-type unsaturation in a polyol, resulting from propylene oxide isomerization to eliminate an alcohol functional group during polyol manufacture, potentially forming undesirable monofunctional alcohol (monol) chains. Preferably, the polyol of the present invention has a low level of unsaturation, for example equal to or less than 0.03 milliequivalents per gram (meq/g), preferably less than 0.02 meq/g, more preferably less than 0.015 meq/g of polyol. Polyols for use in the present invention can have unsaturation values of equal to or greater than 0.0001 meq/g, preferably equal to or greater than 0.0005 meq/g. Unsaturation may be determined according to American Society for Testing and Materials (ASTM) method D-4671.

Preferred polyols for use in the present invention have a high primary hydroxyl content, preferably the primary hydroxyl content is equal to or greater than 50 percent, more preferably equal to or greater than 60 percent, still more preferably equal to or greater than 75 percent, and most preferably equal to or greater than 80 percent, based on the total number of primary and secondary hydroxyls in the polyol.

Suitable polyols for use in the present invention have a mean molecular weight of from equal to or greater than 300 grams per mole (g/mol), more preferably of from equal to or greater than 400 g/mol, and even more preferably of from 600 g/mol. Suitable polyols have a mean molecular weight of from equal to or less than 8,000 g/mol, more preferably of from equal to or less than 5,000 g/mol, and even more preferably of from equal to or less than 4,000 g/mol. The mean molecular weight can, for example, be determined by means of gel permeation chromatography (GPC). Suitable methods are known in principle to those skilled in the art. Polystyrene or, particularly for the measurement of esters, polymethyl methacrylate, are examples of compounds that can be used as standards for the GPC measurements.

Polyols may be prepared by reacting one or more alkylene oxides having 2 to 4 carbon atoms in the alkylene radical and an initiator molecule containing 2 to 8, preferably 2 to 4, active hydrogen atoms. Well established manufacturing processes, such as anionic or cationic polymerization, are suitable for preparing these polyols. Suitable anionic polymerization processes may use alkali hydroxides such as sodium, potassium or cesium hydroxide, or alkali alcoholates such as sodium, potassium or cesium methylate, -ethylate or -isopropoxylate as catalyst(s). Suitable cationic polymerization processes may use Lewis acids such as antimony pentachloride, boron fluoride-etherate or transition metal catalysts, such as cobalt, zinc or blends thereof. Double metal cyanide (DMC) catalysts are particularly useful for the preparation of polyols. Examples of some DMC catalysts and their preparation may be found in U.S. Pat. Nos. 3,427,334; 3,941,849; 4,477,589; 5,158,922; 5,470,813; 5,482,908; and 7,348,460. Suitable alkylene oxides for the preparation of polyether polyols include tetrahydrofuran, ethylene oxide, 1,3-propylene oxide, 1,2- or 2,3-butylene oxide, styrene oxide and epichlorohydrin. Ethylene oxide and propylene oxide are preferred. The alkylene oxides may be used individually, alternating in sequence, or as mixtures. Possible initiator molecules include water, organic dicarboxylic acids, aliphatic and aromatic N-mono, N,N,N',N'-dialkyl substituted diamines having 1 to 4 carbons in the alkyl radical, and mono-alkyl tertiary amines. Other initiator molecules include alkanolamines such as ethanolamine, diethanol amines, N-methyl- and N-ethylene ethanolamines, diethanolamines, triethanolamine ammonia, hydrazine and hydrazide. Preferably used are multifunctional, particularly bi- and trifunctional alcohols such as ethylene glycol, propylene glycol, trimethylene glycol, diethylene glycol, dipropylene glycol, 1,4-butane glycol, 1,6-hexamethylene glycol, glycerine, trimethylol propane, pentaerythritol, sorbitol and sucrose.

Preferred polyols may be used individually or in the form of mixtures and include polyether polyols, especially alkoxylation products comprised of ethylene oxide, propylene oxide, or butylene oxide homopolymers, random copolymers, or block copolymers, such as VORANOL™ brand polyols available from The Dow Chemical Company, and PTMEG (polytetramethylene ether glycol) polyols. Polyester polyols, including those comprising caprolactone and adipates, polycarbonate polyols, or polyalkylene polyols (hydrogenated or unhydrogenated) are also preferred polyols for the invention. Random or block copolymer polyols of any of the aforementioned polyols, such as PTMEG-polycaprolactone copolymer polyols (available from Perstorp) or copolymers of polyester adipate and polycarbonate polyols are also preferred polyols for the invention.

The polyol is present in the polyol/polymer mixture of (1) polyol, (2) functionalized ethylene-based polymer, (3) optional polar polymer, and (4) reaction products of (1), (2) and (3) in an amount of equal to or greater than 10 weight percent, more preferably equal to or greater than 40 weight percent, still more preferably equal to or greater than 50 weight percent, wherein weight percent is based on the total weight of the mixture. The polyol is present in the polyol/polymer mixture in an amount of equal to or less than 90 weight percent, more preferably equal to or less than 85 weight percent, still more preferably equal to or less than 80 weight percent, wherein weight percent is based on the total weight of the mixture.

Functionalized Ethylene-Based Polymer

In one embodiment, the functionalized ethylene-based polymer is an anhydride and/or carboxylic acid functionalized ethylene/alpha-olefin interpolymer. Preferred α-olefins include, but are not limited to, $C_3$-$C_{20}$ α-olefins, and preferably $C_3$-$C_{10}$ α-olefins. More preferred α-olefins include propylene, 1-butene, 1-pentene, 1-hexene, 1-heptene and 1-octene, and more preferably include propylene, 1-butene, 1-hexene and 1-octene.

In one embodiment, component (2) of the polyol/polymer mixture of (1) polyol, (2) functionalized ethylene-based polymer, (3) optional polar polymer, and (4) reaction products of (1), (2) and (3) is an anhydride and carboxylic acid functionalized ethylene/alpha-olefin interpolymer. In a further embodiment, the functionalized ethylene-based polymer is an anhydride and/or carboxylic acid functionalized ethylene/α-olefin copolymer, and further a maleic anhydride grafted ethylene/octene copolymer.

In one embodiment, the functional component, e.g., anhydride and/or carboxylic acid group, of the functionalized ethylene-based polymer, e.g., ethylene/alpha-olefin interpolymer, of component (2) comprises greater than, or equal to, 0.5 weight percent, further greater than, or equal to, 0.7 weight percent, further greater than, or equal to, 0.8 weight percent, further greater than, or equal to, 0.9 weight percent, and further greater than, or equal to, 1.0 weight percent of the functionality, based on the weight of the polymer. In a further embodiment, the functionalized ethylene-based polymer is an anhydride and/or carboxylic acid functionalized ethylene/α-olefin copolymer, and further a maleic anhydride grafted ethylene/octene copolymer.

In one embodiment, the functional component, e.g., anhydride and/or carboxylic acid group, of the functionalized ethylene-based polymer, e.g., ethylene/alpha-olefin interpolymer, of component (2) comprises from 0.9 to 1.5 weight percent, further from 0.9 to 1.4 weight percent, further from 0.9 to 1.3 weight percent of the functionality, based on the weight of the polymer. In a further embodiment, the functionalized ethylene-based polymer is an anhydride and/or carboxylic acid functionalized ethylene/α-olefin copolymer, and further a maleic anhydride grafted ethylene/octene copolymer.

In one embodiment, the functionalized ethylene-based polymer of component (2) has a melt viscosity greater than, or equal to, 8,000 cP, further greater than, or equal to, 9,000 cP, further greater than, or equal to, 10,000 cP, and further greater than, or equal to, 11,000 cP, at 350° F. (177° C.). In a further embodiment, the functionalized ethylene-based polymer is an anhydride and/or carboxylic acid functionalized ethylene/α-olefin copolymer, and further a maleic anhydride grafted ethylene/octene copolymer.

In one embodiment, the functionalized ethylene-based polymer of component (2) has a melt viscosity less than, or equal to, 20,000 cP, further less than, or equal to, 19,000 cP, further less than, or equal to, 18,000 cP, and further less than, or equal to, 17,000 cP, at 350° F. (177° C.). In a further embodiment, the functionalized ethylene-based polymer is an anhydride and/or carboxylic acid functionalized ethylene/α-olefin copolymer, and further a maleic anhydride grafted ethylene/octene copolymer.

In one embodiment, the functionalized ethylene-based polymer of component (2) has a melt viscosity from 8,000 cP to 20,000 cP, further from 9,000 cP to 19,000 cP, further from 10,000 cP to 18,000 cP, at 350° F. (177° C.), and further from 12,000 cP to 16,000 cP, at 350° F. (177° C.). In a further embodiment, the functionalized ethylene-based polymer is an anhydride and/or carboxylic acid functionalized ethylene/α-olefin copolymer, and further a maleic anhydride grafted ethylene/octene copolymer.

In one embodiment, the functionalized ethylene-based polymer of component (2) has a molecular weight distribution (Mw/Mn) less than, or equal to, 5.0, further less than, or equal to, 4.0, further less than, or equal to, 3.0, and further less than, or equal to, 2.5. In a further embodiment, the functionalized ethylene-based polymer is an anhydride and/or carboxylic acid functionalized ethylene/α-olefin copolymer, and further a maleic anhydride grafted ethylene/octene copolymer.

In one embodiment, the functionalized ethylene-based polymer of component (2) has a molecular weight distribution (Mw/Mn) greater than, or equal to, 1.1, further greater than, or equal to, 1.3, and further greater than, or equal to, 1.5. In a further embodiment, the functionalized ethylene-based polymer is an anhydride and/or carboxylic acid functionalized ethylene/α-olefin copolymer, and further a maleic anhydride grafted ethylene/octene copolymer.

In one embodiment, the functionalized ethylene-based polymer of component (2) has a weight average molecular weight (Mw) less than, or equal to, 50,000 grams per mole (g/mole), further less than, or equal to, 40,000 g/mole, further less than, or equal to, 30,000 g/mole. In a further embodiment, the functionalized ethylene-based polymer is an anhydride and/or carboxylic acid functionalized ethylene/α-olefin copolymer, and further a maleic anhydride grafted ethylene/octene copolymer.

In one embodiment, the functionalized ethylene-based polymer of component (2) has a weight average molecular weight (Mw) greater than, or equal to, 2000 g/mole, further greater than, or equal to, 3000 g/mole, further greater than, or equal to, 4000 g/mole. In a further embodiment, the functionalized ethylene-based polymer is an anhydride and/or carboxylic acid functionalized ethylene/α-olefin copolymer, and further a maleic anhydride grafted ethylene/octene copolymer.

In one embodiment, the functionalized ethylene-based polymer of component (2) has a melt index ($I_2$), or calculated melt index ($I_2$), greater than, or equal to, 300 grams per 10 minutes (g/10 min), further greater than, or equal to, 400 g/10 min, and more further greater than, or equal to, 500 g/10 min. In a further embodiment, the functionalized ethylene-based polymer is an anhydride and/or carboxylic acid functionalized ethylene/α-olefin copolymer, and further a maleic anhydride grafted ethylene/octene copolymer.

In one embodiment, the functionalized ethylene-based polymer of component (2) has a melt index ($I_2$), or calculated melt index ($I_2$), less than, or equal to, 1500 g/10 min, further less than, or equal to, 1200 g/10 min, and more further less than, or equal to, 1000 g/10 min. In a further embodiment, the functionalized ethylene-based polymer is an anhydride and/or carboxylic acid functionalized ethylene/α-olefin copolymer, and further a maleic anhydride grafted ethylene/octene copolymer.

In one embodiment, the functionalized ethylene-based polymer of component (2) has a percent crystallinity of less than, or equal to, 40 percent, further less than, or equal to, 35 percent, further less than, or equal to, 30 percent, further less than, or equal to, 25 percent, and further less than, or equal to, 20 percent, as determined by differential scanning calorimetry (DSC). In a further embodiment, the functionalized ethylene-based polymer is an anhydride and/or carboxylic acid functionalized ethylene/α-olefin copolymer, and further a maleic anhydride grafted ethylene/octene copolymer.

In one embodiment, the functionalized ethylene-based polymer of component (2) has a percent crystallinity of greater than, or equal to, 2 percent, further greater than, or equal to, 5 percent, and further greater than, or equal to, 10 percent, as determined by DSC. In a further embodiment, the functionalized ethylene-based polymer is an anhydride and/or carboxylic acid functionalized ethylene/α-olefin copolymer, and further a maleic anhydride grafted ethylene/octene copolymer.

In one embodiment, the functionalized ethylene-based polymer of component (2) has a density greater than, or equal to, 0.850 g/cc, further greater than, or equal to, 0.855 g/cc, add further greater than, or equal to, 0.860 g/cc. In a further embodiment, the functionalized ethylene-based polymer is an anhydride and/or carboxylic acid functionalized ethylene/α-olefin copolymer, and further a maleic anhydride grafted ethylene/octene copolymer.

In one embodiment, the functionalized ethylene-based polymer of component (2) has a density less than, or equal to, 0.900 g/cc, further less than, or equal to, 0.895 g/cc, and further less than, or equal to, 0.890 g/cc. In a further embodiment, the functionalized ethylene-based polymer is an anhydride and/or carboxylic acid functionalized ethylene/α-olefin copolymer, and further a maleic anhydride grafted ethylene/octene copolymer.

In one embodiment, the functionalized ethylene-based polymer of component (2) has a density from 0.855 g/cc to 0.900 g/cc, further from 0.860 g/cc to 0.895 g/cc, and further from 0.865 g/cc to 0.890 g/cc. In a further embodiment, the functionalized ethylene-based polymer is an anhydride and/or carboxylic acid functionalized ethylene/α-olefin copolymer, and further a maleic anhydride grafted ethylene/octene copolymer.

Suitable functionalized copolymers include maleic anhydride (MAH)-grafted copolymers (for example, AFFINITY GA 1000R Polyolefin Plastomer, available from The Dow Chemical Company).

The functionalized ethylene-based polymer is present in the polyol/polymer mixture of (1) polyol, (2) functionalized ethylene-based polymer, (3) optional polar polymer, and (4) reaction products of (1), (2) and (3) in an amount of equal to or greater than 1 weight percent, more preferably equal to or greater than 3 weight percent, still more preferably equal to or greater than 5 weight percent, wherein weight percent is based on the total weight of the mixture. The functionalized ethylene-based polymer is present in the polyol/polymer mixture in an amount of equal to or less than 90 weight percent, more preferably equal to or less than 70 weight percent, still more preferably equal to or less than 50 weight percent, further less than, or equal to, 30 weight percent, wherein weight percent is based on the total weight of the mixture.

The functionalized ethylene-based polymer may comprise a combination of two or more embodiments as described herein.

Optional Polar Polymer

In one embodiment of the invention, the mixture of the (A) component of the primer composition contains a polar polymer. "Polar", "polar polymer" and like terms mean that the polymer molecules have a permanent dipole, i.e., the polymer molecule has a positive end and a negative end. In other words, the electrons in a polar molecule are not shared equally among the atoms of the molecule. In contrast, "nonpolar," "nonpolar polymer" and like terms mean that the polymer molecules do not have a permanent dipole, i.e., the polymer does not have a positive end and a negative end. The electrons in a nonpolar molecule are essentially equally shared among the atoms of the molecule.

One group of preferred polar polymers are polar olefin-based polymers. A "polar olefin-based polymer" is an olefin-based polymer containing one or more polar groups (sometimes referred to as polar functionalities). A "polar group," as used herein, is any group that imparts a bond dipole moment to an otherwise essentially nonpolar olefin molecule. Exemplary polar groups include carbonyls, carboxylic acid groups, carboxylic acid anhydrate groups, carboxylic ester groups, epoxy groups, sulfonyl groups, nitrile groups, amide groups, silane groups and the like, and these groups can be introduced into the olefin-based polymer either through grafting or copolymerization. Nonlimiting examples of polar olefin-based polymers include ethylene/acrylic acid (EAA), ethylene/methacrylic acid (EMA), ethylene/acrylate or methacrylate, ethylene/vinyl acetate (EVA), poly(ethylene-co-vinyltrimethoxysilane) copolymer, maleic anhydrate- or silane-grafted olefin polymers, poly(tetrafluoroethylene-alt-ethylene) (ETFE), poly(tetrafluoroethylene-co-hexafluoropropylene) (FEP), poly(ethylene-co-tetrafluoroethylene-co-hexafluoropropylene) (EFEP), poly(vinylidene fluoride) (PVDF), poly(vinyl fluoride) (PVF), and the like. Preferred polar olefin polymers include ethylene vinyl acetate (EVA) resins, ethylene ethyl acrylate (EEA) ethylene/acrylic acid copolymers and poly(ethylene-co-vinyltrimethoxysilane). Some commercial polymers include DuPont ELVAX™ ethylene vinyl acetate (EVA) resins, AMPLIFY™ ethylene ethyl acrylate (EEA) copolymer from The Dow Chemical Company, PRIMACOR™ ethylene/acrylic acid copolymers from The Dow Chemical Company, and SI-LINK™ poly(ethylene-co-vinyltrimethoxysilane) copolymer from The Dow Chemical Company.

If present in the mixture of the (A) component of the primer composition, the polar polymer is present in an amount of equal to or greater than 0, preferably greater than 0.1 weight percent, more preferably equal to or greater than 0.5 weight percent, and more preferably equal to or greater than 1 weight percent, based on the total weight of the mixture of the (A) component of the primer composition. If present in the mixture of the (A) component of the primer composition, the polar polymer is present in an amount of equal to or less than 50 weight percent, more preferably equal to or less than 30 weight percent, still more preferably equal to or less than 10 weight percent, based on the total weight of the mixture of the (A) component of the primer composition.

Reaction Products of the Polyol, Functionalized Ethylene-Based Polymer and Polar Polymer When combined together, the components of the mixture of the (A) component of the primer composition, specifically the polyol, functionalized ethylene-based polymer, and optional polar polymer, may react together to form reaction products, such as, but not limited to, an ester of a functionalized ethylene-based polymer (e.g., an ethylene-based polymer grafted with maleic anhydride) and the polyol formed by the reaction of the polyol hydroxyl end group with the maleic anhydride group of the functionalized ethylene-based polymer. The mixture of the (A) component of the primer composition can compromise any reaction product between the polyol, the functionalized ethylene-based polymer and optional polar polymer.

The reaction products of the polyol, functionalized ethylene-based polymer, and optional polar polymer are present in an amount of equal to or greater than 0, typically greater than 1 weight percent, more typically equal to or greater than 3 weight percent, and more typically equal to or greater than 5 weight percent, based on the total weight of the mixture of the (A) component of the primer composition. The reaction products of the polyol, functionalized ethylene-based polymer, and optional polar polymer are typically present in an amount of equal to or less than 90 weight percent, more typically equal to or less than 70 weight percent, and still more typically equal to or less than 50 weight percent, further equal to or less than 30 weight percent, based on the total weight of the mixture of the (A) component of the primer composition.

Component (B) Solvent of the Primer Composition

The solvents used in the practice of this invention are inert to the polyols, functionalized ethylene-based polymers, optional polar polymers, and reaction products of this invention. "Inert" and like terms mean that the solvent is essentially nonreactive with the polyols, functionalized ethylene-based polymers, optional polar polymers, and reaction products of this invention under conditions in which the primer composition is formulated, stored, shipped or used. Typically and preferably the solvents used in the practice of this invention are paraffinic and/or aromatic hydrocarbons or inertly-substituted hydrocarbons such as, but not limited to, hexane, cyclohexane, methyl cyclohexane, ethyl cyclohexane, benzene, toluene, xylene, naphthalene, trichlorobenzene, tetrachlorobenzene, and the like. These compounds can be used alone or in combination with one another. Unsubstituted aromatic hydrocarbons are preferred. Nonlimiting examples of solvents that are not useful in the practice of this invention, i.e., solvents that are not inert to the polyols, etc., include alcohols, ketones and aldehydes.

Primer Composition

The primer composition of this invention comprises, preferably consists essentially of, the mixture of component (A) and the solvent of component (B). Typically the amount of the mixture of component (A) in the primer composition is from 5 to 20, preferably from 5 to 15 and more preferably from 5 to 10, weight percent based on the weight of the primer composition. Typically the amount of the solvent of component (B) in the primer composition is from 95 to 80, preferably from 95 to 85 and more preferably from 95 to 90, weight percent based on the weight of the primer composition.

The following examples further illustrate, but do not limit, the invention.

EXAMPLES

Test Methods

Density is measured according to ASTM D-792.

Melt index (MI) is measured according to ASTM D-1238 (190° C./2.16 kg (g/10 minutes)).

Melt flow rate (MFR) is measured according to ASTM D-1238 (230° C./2.16 kg (g/10 minutes)).

Melt viscosity is measured in accordance with ASTM D 3236 (350° F., 177 C), using a Brookfield Digital Viscometer (Model DV-III, version 3), and disposable aluminum sample chambers. The spindle used, in general, is a SC-31 hot-melt spindle, suitable for measuring viscosities in the range from 10 to 100,000 centipoise. The sample is poured into the chamber, which is, in turn, inserted into a Brookfield Thermosel, and locked into place. The sample chamber has a notch on the bottom that fits the bottom of the Brookfield Thermosel, to ensure that the chamber is not allowed to turn when the spindle is inserted and spinning. The sample (approximately 8-10 grams of resin) is heated to the required temperature, until the melted sample is about one inch below the top of the sample chamber. The viscometer apparatus is lowered, and the spindle submerged into the sample chamber. Lowering is continued, until the brackets on the viscometer align on the Thermosel. The viscometer is turned on, and set to operate at a shear rate which leads to a torque reading in the range of 40 to 60 percent of the total torque capacity, based on the revolutions per minute (rpm) output of the viscometer. Readings are taken every minute for about 15 minutes, or until the values stabilize, at which point, a final reading is recorded.

Starting Materials

Preparation of MAH-Functionalized Ethylene/Octene Copolymer

The ethylene-based polymer is a low molecular weight (Mn=8,000 to 12,000 g/mole) ethylene-octene copolymer with a melt viscosity range of 6,000 to 17,000 cP (measured at 350° F. (177° C.)), a nominal (calculated, see U.S. Pat. No. 6,335,410 calculation for melt index ($I_2$, 190° C./2.16 kg)) melt index ($I_2$) of 1,000 g/10 min, and a density of 0.87 g/cc. The peroxide is LUPEROX™ 101 (2,5-bis(tert-butylperoxy)-2,5-dimethylhexane (290.44 g/mol)) from Arkema. HYDROBRITE™ 380 (a hydro-treated paraffinic oil) from Sonneborn is used as needed to dilute the peroxide (typically at a 1:1 ratio of oil to peroxide (Oil:POX)). The maleic anhydride (MAH) is obtained from DeGussa.

The MAH-functionalized ethylene/octene copolymer is prepared using a twin screw extruder (TSE) operated at the conditions reported in Table 1.

TABLE 1

| Operating Conditions of the TSE | |
|---|---|
| Condition | Unit |
| Feed Barrel - Cooling | 49° C. |
| Barrel #3 | 120° C. |
| Barrels #4-11 | 235° C. |
| Transfer Lines and Gear Pumps | 150° C. |
| Die | 204° C. |
| Screw Speed | 386 rpm |
| MAH | 16.25 lb/h |
| MAH % Feed | 1.55 |
| 1:1 Oil:POX | 3.6 lb/h |
| 1:1 Oil:POX % Feed | 0.34 |
| Pure POX Feed | 0.17% |
| Vacuum Pressure | 20 cm Hg |

The TSE is set to run at the selected barrel temperature profiles, and the screw speeds set to the desired revolutions per minute (rpm). Pellets of ethylene-octene copolymer are fed into the hopper of the extruder by a gravimetrically controlled auger feeder, at the desired polymer feed rate. Molten MAH is injected into the barrel. Peroxide is then injected into the barrel, and downstream from the MAH, as a 1:1 mineral oil solution, at a target feed rate. Kneading blocks distribute the reactive ingredients, and the polymer pellets are melted through mechanical energy dissipation, and the reaction occurs following thermal decomposition of peroxide initiator. Volatile unreacted components and byproducts are removed at a vacuum port. The melt is cooled in the final barrel section of the TSE, fed to a gear pump, and then to a die, from which the melt undergoes underwater pelletization. A pellet slurry, cooling line of sufficient length is used to achieve a residence time of greater than 60 seconds so as to cool the pellets to less than 25° C. The pelletized product is dried and collected. The MAH content of the product is greater than, or equal to, 0.9 weight percent (density about 0.88 g/cc, melt viscosity around 13,000 cP (at 177° C.)).

Substrate Materials

DOW HDPE DMDA-8920 NT 7 is a high density polyethylene (0.954 g/cm$^3$ density; 20 g/10 min melt index (MI)) available from The Dow Chemical Company.

Polypropylene H700-12 is a polypropylene homopolymer (12 g/10 min melt flow rate (MFR)) available from Braskem.

INFUSE™ 9530 is an olefin block copolymer (0.887 g/cm$^3$ density; 5 g/10 min MI) available from The Dow Chemical Company.

INFUSE™ 9507 is an olefin block copolymer (0.866 g/cm$^3$ density; 5 g/10 min MI) available from The Dow Chemical Company.

INFUSE™ 9010 is an olefin block copolymer (0.877 g/cm$^3$ density; 0.50 g/10 min MI) available from The Dow Chemical Company.

INFUSE™ 9010/hPP H700-12 is a blend of INFUSE™ 9010 olefin block copolymer (75 wt %) and Polypropylene H700-12 (25 wt %).

PRIMACOR™ 59801 is an ethylene acrylic acid copolymer (0.958 g/cm$^3$ density; 300 g/10 min MI) available from The Dow Chemical Company.

Each substrate is prepared using an injection molding process operated at a temperature from 170° C. to 225° C.; a pressure from 250 to 1100 Bar (25 to 110 megaPascal (MPa)); and a cycle time from 50 to 75 seconds. Plaque dimensions are 4 inch×6 inch×⅛ inch (thick), and thus each plaque has 24 square inches (15,484 square millimeters) of surface area.

Preparation of a Polyol-Modified, MAH-g-Ethylene/Octene Copolymer (PM-MAH-g-EO)

The polyol modification (PM) of the maleic anhydride grafted (MAH-g-) ethylene/octene copolymer is prepared in a batch manner. A stainless steel, open-topped, cylindrical vessel (20.3 cm high, 6.5 cm internal diameter (ID)) is fitted with an agitator (4.5 cm diameter Cowles blade), a heating mantle, a thermocouple, and a continuous nitrogen gas purge over the top. The vessel is placed on a laboratory jack, so that the depth of the agitator in the vessel is adjustable by adjusting the elevation of the vessel.

Polyol (VORANOL™ 223-060L (a diol based on propylene and ethylene oxide with a low monol content, a hydroxy number (KOH) of 59.0 to 63.0 mg/KOH/g (ASTM D4274), and dried overnight in a vacuum oven at 60° C., is added to the vessel, under 400 rotations per minute (rpm) agitation. The vessel is heated to 170° C. MAH-g-ethylene/octene copolymer (dried overnight in vacuum oven at 150° C.) is added to the vessel over 30 minutes. Once the MAH-g-ethylene/octene copolymer is added, the homogeneous liquid is agitated, at about 1000 rpm, for 30 minutes, at 170° C., after which, the heating mantle is turned off, and the dispersion is allowed to cool to 60° C., under the same agitation, forming a coarse dispersion. Table 2 reports the amounts of components in four mixtures containing the PM-MAH-g-EO.

TABLE 2

Mixtures Containing PM-MAH-g-EO

| Mixture | PM-MAH-g-EO wt %, based on the weight of the mixture | Excess Polyol wt %, based on the weight of the mixture | Ethylene Acrylic Acid (EAA) wt %, based on the weight of the mixture | Appearance after one week (7 days) at ambient conditions |
|---|---|---|---|---|
| PM-MAH-g-EO Mixture #1 | 50 | 50 | | Solid white wax |
| PM-MAH-g-EO Mixture #2 | 30 | 70 | | Suspension separating over time |
| PM-MAH-g-EO Mixture #3 | 20 | 80 | | Suspension separating over time |
| PM-MAH-g-EO Mixture #4 | 16.7 | 80 | 3.3 | Milky white suspension |

As seen in Table 2, the Mixture #1 is a solid waxy substance, and does not require any preparation before use in the primer composition, as discussed below.

Mixture #2 phase separates over time, and a solid, waxy substance forms. A portion of this solid waxy substance is removed, and immediately used "as is" (Mixture #2A) in the primer composition, as described below. The remaining mixture is stirred at room temperature for 30 to 60 seconds, and immediately is used "as is" (Mixture #2B) in the primer composition as described below.

Mixture #3 also phase separates over time, and a solid, waxy substance forms. The solid waxy substance is remove, and immediately used "as is" (Mixture #3A) in the primer composition as described below. The remaining mixture is stirred at room temperature for 30 to 60 seconds, and immediately is used "as is" (Mixture #3B) in the primer composition as described below.

A semi-solid waxy substance forms in Mixture #4, and this mixture is used "as is", and immediately it is used to form the primer composition as described below.

Preparation of Primer Composition (PC) and Application of the PC to a Substrate

Each mixture (Mixture #1, Mixture #2A, Mixture #2B, Mixture #3A, Mixture #3B, Mixture #4) is weighed and diluted in either xylene or ethyl cyclohexane (ECH) at 10 wt % of the mixture, based on the primer composition. The solutions are heated on a hot plate with occasional shaking to help homogenize the blend. A temperature of 80° C. is sufficient to fully dissolve any solids. Primer compositions are shown in Table 3.

TABLE 3

Primer Compositions

| Primer Composition (PC #) | PM-MAH-g-EO Mixture # (wt %) | Xylene (wt %) | ECH (wt %) |
|---|---|---|---|
| PC#1 | Mixture #1 10 wt % | 90 wt % | |
| PC#2A | Mixture #2A 10 wt % | 90 wt % | |
| PC#2B | Mixture #2B 10 wt % | 90 wt % | |
| PC#3A | Mixture #3A 10 wt % | 90 wt % | |
| PC#3B | Mixture #3B 10 wt % | 90 wt % | |
| PC#4 | Mixture #4 10 wt % | 90 wt % | |
| PC#5 | Mixture 2A 10 wt % | | 90 wt % |

After dissolution, the solution is allowed to cool, and then applied to the olefin block copolymer (OBC) or homopolymer PP substrates using a paint brush. Each warm primer composition is applied warm to the surface of the substrate plaque to form a coating of 20-30 microns (thickness). The primer composition is allowed to dry for at least 16 hours at ambient conditions (23° C. and atmospheric pressure).

The surface of each dried primer film is painted with COLOR COAT™ paint, an elastomeric coating formulated for vinyl surfaces and available from SEM Inc., to produce a 10-30 micron thick paint coating. The paint is allowed to dry for at least 24 hours at ambient conditions (23° C. and atmospheric pressure). For each primed substrate, an unprimed substrate is also painted for comparison.

Adhesion Testing

Crosshatch adhesion is a common industrial method for evaluating adhesion strength of a coating to a substrate. A crosshatch scribe is used to make parallel linear cuts through the surface coating. A similar set of linear cuts is made perpendicular to the original cuts, in order to obtain a checker board pattern. The total number of individual squares are 100.

A tape (Scotch Tape 3M #810) is applied to the scribed surface, and the tape-covered area is rubbed with fingers in order to apply adequate pressure, ensuring intimate contact with the surface (approximate 50 g force). The painted substrate test sample is allowed to sit for 10-30 seconds, and then the loose end of the tape is hand pulled, smoothly at an angle of about 135 degrees, to remove the tape from the surface. The coated surface is then visually evaluated for adhesion (ASTM D3359), and ranked using a numerical scaling to provide an indication of the adhesion strength (or the adhesion between the paint and the primer).

Poor adhesion is observed when a majority of the scribed squares peel off with the tape. Excellent adhesion is observed when none (or few) of the scribed squares peel off with the tape. The adhesion is ranked from 0B to 5B. Zero (0B) being the worst case (>65% of the area of the scribed squares fail (or peeled off with the tape)), and 5B being the best (0% of the area of the scribed squares fail (peeled off with the tape)). The results are reported in Table 4. As seen in Table 4, the inventive primed substrates, in general, have better adhesion than the unprimed substrates.

TABLE 4

Results of Adhesion Testing

| Primer Composition | Substrate | Adhesion Performance* Primed substrate | Adhesion Performance* Unprimed Substrate |
|---|---|---|---|
| PC#1 | HDPE 8920 | 5B | 0B |
| PC#1 | hPP H700-12 | 4B | 0B |
| PC#1 | INFUSE 9507 | 4B | 0B |
| PC#1 | INFUSE 9010 | 4B | 0B |
| PC#1 | INFUSE 9530 | 3B | 0B |
| PC#2B | HDPE 8920 | 4B | 0B |
| PC#2B | hPP H700-12 | 1B | 0B |
| PC#2B | INFUSE 9507 | 5B | 0B |
| PC#2B | INFUSE 9010 | 4B | 0B |
| PC#2B | INFUSE 9530 | 4B | 0B |
| PC#3B | HDPE 8920 | 0B | 0B |
| PC#3B | hPP H700-12 | 0B | 0B |
| PC#3B | INFUSE 9507 | 4B | 0B |
| PC#3B | INFUSE 9010 | 4B | 0B |
| PC#3B | INFUSE 9530 | 5B | 0B |
| PC#2B | INFUSE 9010/hPP H700-12 | 5B | 0B |
| PC#2B | INFUSE 9010/hPP H700-12 | 4B | 0B |

*5B 0% area of the scribed squares fail; 4B greater than zero and less, or equal to, 5% area of the scribed squares fail; 3B greater than 5% to less than, or equal to, 15% area of the scribed squares fail; 2B greater than 15% to less than, or equal to, 35% area of the scribed squares fail; 1B greater than 35% to less than, or equal to, 65% area of the scribed squares fail; 0B greater 65% area of the scribed squares fail.

We claim:

1. A mixture comprising:
   (1) at least one polyol that is a polyether polyol having a primary hydroxy content from 50% to 80% and a mean molecular weight from 600 g/mol to 5000 g/mol, the at least one polyol present in the mixture in an amount of greater than 0 weight percent to less than or equal to 90 weight percent,
   (2) a functionalized ethylene-based polymer that comprises the following properties:
      (a) a density from 0.855 to 0.90 g/cc, and
      (b) a melt viscosity (at 177° C.) from 8,000 to 20,000 cP, and
      (c) a functional group capable of further reaction,
   (3) optionally, at least one polar polymer; and
   (4) reaction products of (1) and (2), and, optionally, (3), the reaction products present in the mixture in an amount of greater than or equal to 1 weight percent to less than or equal to 90 weight percent.

2. The mixture of claim 1, in which the functionalized ethylene-based polymer is a maleic anhydride functionalized ethylene-based polymer.

3. The mixture of claim 1, in which the functionalized ethylene-based polymer is a maleic anhydride grafted ethylene-based polymer.

4. The mixture of claim 1, in which the functionalized ethylene-based polymer is a maleic anhydride grafted ethylene/alpha-olefin copolymer.

5. The mixture of claim 1, in which the polyol is present in the mixture of component (A) in an amount of greater than or equal to 10 weight percent to less than or equal to 80 weight percent based upon the weight of the mixture.

6. An article comprising a substrate formed from a composition comprising at least one olefin-based polymer, wherein the substrate is coated with a primer film formed from a primer composition, wherein the primer composition comprises the following (A) and (B):
- (A) from 5.0 to 20.0 weight percent, based on the weight of the primer composition, of a mixture comprising the following:
  - (1) at least one polyol that is a polyether polyol having a primary hydroxy content from 50% to 80% and a mean molecular weight from 600 g/mol to 5000 g/mol, the at least one polyol present in the mixture in an amount of greater than 0 weight percent to less than or equal to 90 weight percent,
  - (2) a functionalized ethylene-based polymer that comprises the following properties:
    - (a) a density from 0.855 to 0.90 g/cc, and
    - (b) a melt viscosity (at 177° C.) from 8,000 to 20,000 cP, and
    - (c) a functional group capable of further reaction,
  - (3) optionally, at least one polar polymer; and
  - (4) reaction products of (1) and (2), and, optionally, (3) the reaction products present in the mixture in an amount of greater than or equal to 1 weight percent to less than or equal to 90 weight percent; and
- (B) greater than, or equal to 80.0 weight percent, based on the weight of the primer composition, of at least one solvent.

7. The article of claim 6, in which the functionalized ethylene-based polymer is a maleic anhydride functionalized ethylene-based polymer.

8. The article of claim 6, in which the functionalized ethylene-based polymer is a maleic anhydride grafted ethylene-based polymer.

9. The article of claim 6, in which the functionalized ethylene-based polymer is a maleic anhydride grafted ethylene/alpha-olefin copolymer.

10. The article of claim 6, in which the polyol is present in the mixture of component (A) in an amount of greater than or equal to 40 weight percent, to less than or equal to 80 weight percent based upon the weight of the mixture.

11. The article of claim 6, in which the functionalized ethylene-based polymer is present in the mixture of component (A) in an amount of greater than or equal to 1 weight percent to less than or equal to 50 weight percent based upon the weight of the mixture.

12. The article of claim 6, in which a polar polymer is present in the mixture of component (A), and is present in an amount of greater than 0 to less than or equal to 10 weight percent based upon the weight of the mixture.

13. The article of claim 6, in which the reaction products of (1) and (2), and, optionally, (3) are present in the mixture of component (A), and are present in an amount of greater than or equal to 5 weight percent to less than or equal to 70 weight percent based upon the weight of the mixture.

14. The article of claim 6, in which the solvent of the primer composition is a paraffinic and/or aromatic hydrocarbon or inertly-substituted hydrocarbon.

15. The article of claim 6, in which the solvent of the primer composition is selected from the group consisting of hexane, cyclohexane, methyl cyclohexane, ethyl cyclohexane, benzene, toluene, xylene, and trichlorobenzene, tetrachlorobenzene.

* * * * *